US012115997B2

(12) United States Patent
Katsuki

(10) Patent No.: US 12,115,997 B2
(45) Date of Patent: Oct. 15, 2024

(54) DRIVE CONTROL SYSTEM

(71) Applicant: IHI CORPORATION, Tokyo (JP)

(72) Inventor: Yoshio Katsuki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 445 days.

(21) Appl. No.: 17/619,748

(22) PCT Filed: Jun. 9, 2020

(86) PCT No.: PCT/JP2020/022659
§ 371 (c)(1),
(2) Date: Dec. 16, 2021

(87) PCT Pub. No.: WO2020/261973
PCT Pub. Date: Dec. 30, 2020

(65) Prior Publication Data
US 2022/0355806 A1    Nov. 10, 2022

(30) Foreign Application Priority Data
Jun. 26, 2019   (JP) ................................. 2019-118572

(51) Int. Cl.
| | | |
|---|---|---|
| *B60W 40/13* | (2012.01) | |
| *B60W 40/04* | (2006.01) | |
| *B60W 60/00* | (2020.01) | |
| *G01S 17/931* | (2020.01) | |

(52) U.S. Cl.
CPC ............ *B60W 40/13* (2013.01); *B60W 40/04* (2013.01); *B60W 60/001* (2020.02); *G01S 17/931* (2020.01)

(58) Field of Classification Search
None
See application file for complete search history.

(56) References Cited

U.S. PATENT DOCUMENTS

| | | | |
|---|---|---|---|
| 11,062,582 B1* | 7/2021 | Van Wiemeersch | ... G08B 29/24 |
| 11,429,113 B2* | 8/2022 | Lee | ......... B25J 9/1697 |
| 11,770,677 B1* | 9/2023 | Lesesky | .................. H04W 4/48 |
| | | | 455/456.1 |
| 11,983,667 B2* | 5/2024 | Jacobus | ................. G05D 1/247 |
| 2016/0119539 A1* | 4/2016 | Tan | ........................ G01S 5/0284 |
| | | | 348/148 |
| 2016/0132058 A1* | 5/2016 | Lee | ..................... B62D 15/0265 |
| | | | 701/26 |
| 2016/0264134 A1* | 9/2016 | Ohsugi | ...................... B60T 7/22 |
| 2016/0332554 A1* | 11/2016 | Ambrosio | ............ B62D 55/065 |
| 2016/0368336 A1 | 12/2016 | Kahn et al. | |
| 2017/0351268 A1* | 12/2017 | Anderson | ............ G07C 5/0825 |
| 2019/0056736 A1 | 2/2019 | Wood et al. | |

(Continued)

FOREIGN PATENT DOCUMENTS

| | | |
|---|---|---|
| CN | 103273880 A | 9/2013 |
| DE | 10 2014 226 108 A1 | 6/2016 |

(Continued)

*Primary Examiner* — Jonathan M Dager

(57) ABSTRACT

A drive control system (S) includes a measurement portion (1) configured to detect an obstacle (R) in a transportation vehicle (T), and a load collapse determination portion (4) configured to acquire an arrangement of a transportation target (C) loaded on the transportation vehicle (T) based on measurement data of the measurement portion (1) to determine a load collapse of the transportation target (C) based on a change in the arrangement over time.

9 Claims, 4 Drawing Sheets

(56) References Cited

U.S. PATENT DOCUMENTS

| | | | |
|---|---|---|---|
| 2019/0206268 A1* | 7/2019 | Taveira | G08G 5/045 |
| 2019/0361094 A1* | 11/2019 | Harris | G01S 17/89 |
| 2021/0147202 A1* | 5/2021 | Black | G05D 1/0212 |
| 2021/0354924 A1* | 11/2021 | Augustsson | B65G 1/1375 |
| 2022/0035684 A1* | 2/2022 | Gupte | G06F 9/5083 |
| 2022/0176959 A1* | 6/2022 | Katsuki | B60W 30/146 |
| 2022/0227356 A1* | 7/2022 | Gould | H04W 4/029 |
| 2022/0379792 A1* | 12/2022 | Wehner | B66F 9/063 |
| 2023/0124314 A1* | 4/2023 | Foster | G01S 17/931 |
| | | | 701/26 |
| 2023/0339455 A1* | 10/2023 | Weston | B60W 40/114 |
| 2024/0124007 A1* | 4/2024 | Hawley | G06T 7/70 |
| 2024/0150159 A1* | 5/2024 | Melchior | B66F 9/0755 |

FOREIGN PATENT DOCUMENTS

| | | |
|---|---|---|
| JP | H10-100773 A | 4/1998 |
| JP | 2001-063446 A | 3/2001 |
| JP | 2005-018472 A | 1/2005 |
| JP | 2012-158445 A | 8/2012 |
| JP | 2013-035399 A | 2/2013 |
| JP | 5165503 B2 | 3/2013 |
| JP | 2013-230903 A | 11/2013 |
| JP | 5429204 B2 | 2/2014 |
| JP | 2014-186693 A | 10/2014 |
| JP | 2016-081159 A | 5/2016 |
| JP | 2017-007444 A | 1/2017 |
| JP | 2017-019596 A | 1/2017 |
| JP | 6136434 B2 | 5/2017 |
| KR | 10-2016-0056561 A | 5/2016 |

\* cited by examiner

DRIVE CONTROL SYSTEM

CROSS REFERENCE TO RELATED APPLICATIONS

This patent application is a U.S. national-stage application under 35 U.S.C. § 371 of International Patent Application No. PCT/JP2020/022659 filed on Jun. 9, 2020, which claims the benefit of foreign priority to Japanese Patent Application No. JP 2019-118572 filed on Jun. 26, 2019, the content of which is incorporated herein by reference. The International Application was published in Japanese on Dec. 30, 2020, as International Publication No. WO 2020/261973 A1 under PCT Article 21 (2).

TECHNICAL FIELD

The present disclosure relates to a drive control system.

BACKGROUND ART

Patent Document 1 discloses a transport vehicle that moves in a state where a load (transportation target) is placed thereon. In such a transport vehicle, in order to prevent and detect the fall of the load, a load collapse detection sensor is used to detect the collapse of the load placed on a placement section. The load collapse detection sensor in Patent Document 1 is a rod-shaped contact sensor, and is disposed in contact with the load. In addition, the transport vehicle of Patent Document 1 is provided with an obstacle sensor that detects an obstacle appearing around the transport vehicle, in addition to the load collapse detection sensor. Patent Document 2 discloses an autonomous mobile unmanned transportation car including a tray presence/absence sensor that detects the presence or absence of a load (tray) in addition to an ultrasonic sensor corresponding to the obstacle sensor of Patent Document 1.

CITATION LIST

Patent Document

[Patent Document 1]
Japanese Unexamined Patent Application, First Publication No. 2012-158445
[Patent Document 2]
Japanese Unexamined Patent Application, First Publication No. 2014-186693

SUMMARY OF INVENTION

Technical Problem

In recent years, autonomous driving using a large transportation vehicle such as a truck has been considered. In such an autonomous driving vehicle, a load collapse cannot be recognized since a driver is not present in the vehicle. Therefore, it is needed to automatically detect the load collapse. However, the configuration of the transport vehicle shown in Patent Document 1 is complicated since it is needed to newly provide a load collapse detection sensor in addition to the obstacle sensor. The same applies to Patent Document 2.

The present disclosure has been made in view of the above circumstances, and an object of the present disclosure is to determine a load collapse in a transportation vehicle with a simple configuration.

Solution to Problem

A drive control system according to a first aspect of the present disclosure includes a measurement portion configured to detect an obstacle in a transportation vehicle, and a load collapse determination portion configured to acquire an arrangement of a transportation target loaded on the transportation vehicle based on measurement data of the measurement portion to determine a load collapse of the transportation target based on a change in the arrangement over time.

For the drive control system according to a second aspect of the present disclosure, in the first aspect, the measurement portion is mounted on the transportation vehicle and performs scanning with laser light to measure a distance between the transportation vehicle and a surrounding body.

For the drive control system according to a third aspect of the present disclosure, in the second aspect, the load collapse determination portion uses a set of a plurality of continuous linear measurement points in an outer shape of the transportation target as a reference for the arrangement of the transportation target.

For the drive control system according to a fourth aspect of the present disclosure, in any one of the first to third aspects, the measurement portion is provided at an upper part of the transportation vehicle.

For the drive control system according to a fifth aspect of the present disclosure, in any one of the first to third aspects, the measurement portion is provided at each of left and right ends of the transportation vehicle.

Effects of Invention

According to the present disclosure, it is possible to determine a load collapse of a transportation target with a simple configuration by a load collapse determination portion based on measurement data of a measurement portion that detects an obstacle.

DESCRIPTION OF EMBODIMENTS

Hereinafter, a drive control system S according to an embodiment of the present disclosure will be described with reference to the drawings.

The drive control system S (drive control system) according to an embodiment of the present disclosure is a system that transports a transportation target (e.g., transportation target C) to a destination place or supports transportation thereof. The drive control system S of the present disclosure is a system that performs autonomous driving of the transportation vehicle T that transports the transportation target C. Furthermore, the transportation vehicle T has a structure including a trailer head H and a loading platform N connected to the trailer head H. The transportation vehicle T may be unmanned or manned, but in the following description, it is assumed that the transportation vehicle T is an unmanned transportation vehicle. The transportation target C is loaded on the loading platform N.

Figure 1:
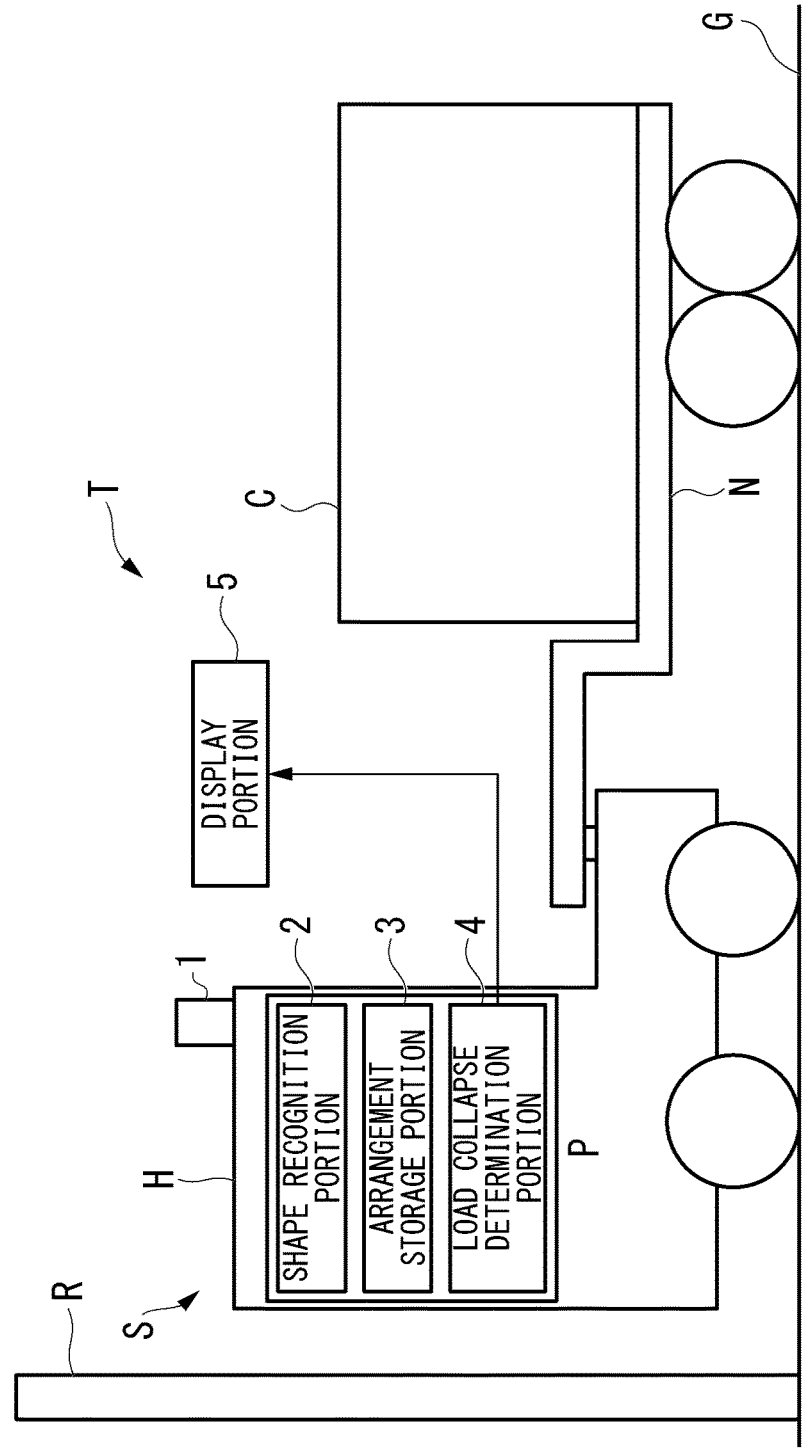
FIG. 1 is a schematic diagram including a drive control system according to an embodiment of the present disclosure.

As shown in FIG. 1, the drive control system S according to the present embodiment has a distance sensor 1 (measurement means or measurement portion), a shape recognition portion 2, an arrangement storage portion 3, and a load collapse determination portion 4 (load collapse determination means) and a display portion 5. Furthermore, the shape recognition portion 2, the arrangement storage portion 3, and the load collapse determination portion 4 are configured as one function of an arithmetic device P. The arithmetic device P is a computer configured with a central processing unit (CPU), memory such as random access memory (RAM) and read only memory (ROM), and an input/output device that exchanges signals with an external device, and the like. As an example of the arithmetic device P, there is an electric control unit (ECU) mounted on the transportation vehicle T to control an internal combustion engine, an electric motor, a transmission, and the like, or a combination thereof. Therefore, as an algorithm executed by the computer or the ECU which is an example thereof, the functions of the shape recognition portion 2, the arrangement storage portion 3, and the load collapse determination portion 4 may be implemented. Furthermore, the shape recognition portion 2, the arrangement storage portion 3, and the load collapse determination portion 4 may each be a computer configured with a CPU, memory such as RAM and ROM, an input/output device that exchanges signals with an external device, and the like. In this case, the functions of the shape recognition portion 2, the arrangement storage portion 3, and the load collapse determination portion 4 may be implemented as an algorithm executed by each computer provided in the shape recognition portion 2, the arrangement storage portion 3, and the load collapse determination portion 4.

Figure 2:
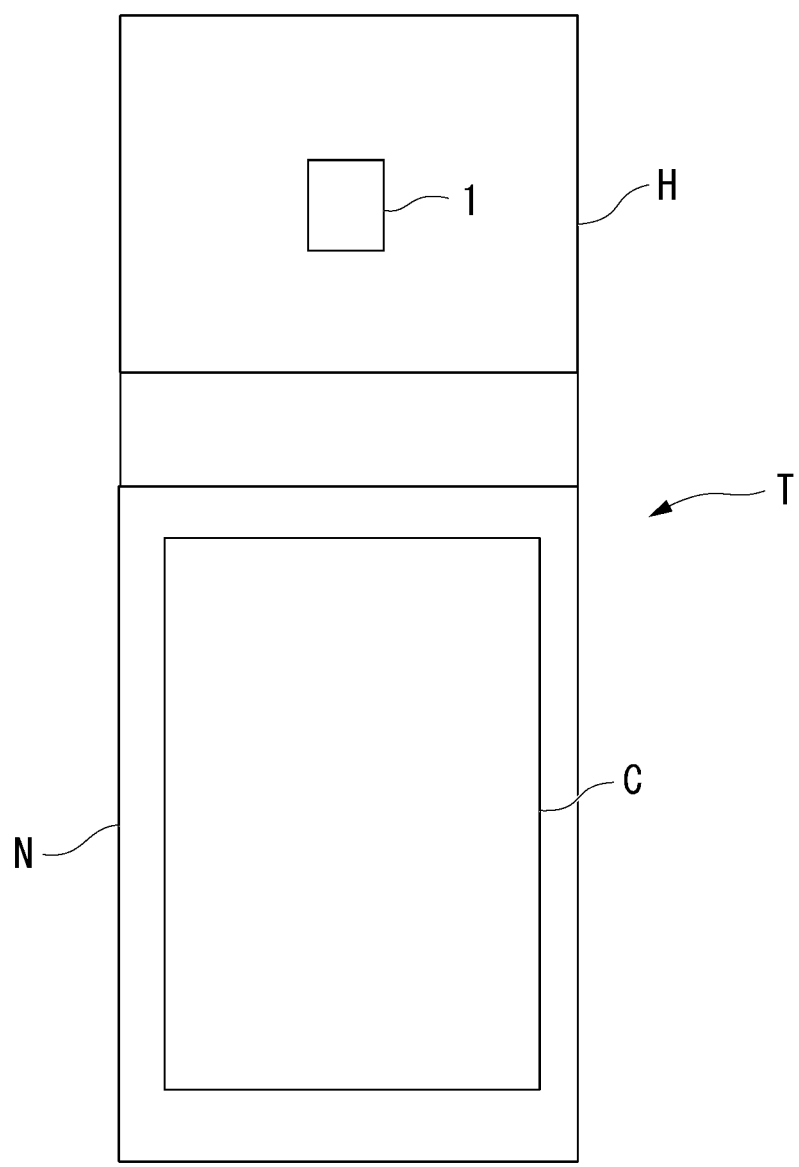
FIG. 2 is a schematic diagram showing a mounting position of a distance sensor in a transportation vehicle.

The distance sensor 1 is provided at an upper part of the trailer head H of the transportation vehicle T (vehicle), for example, as shown in FIGS. 1 and 2. The distance sensor 1 is a device capable of detecting a distance to a target by irradiating the target with a pulsed laser light and measuring a time period until the light reflected from the target reaches the distance sensor 1. Furthermore, the distance sensor 1 mounted at a front side in a traveling direction can scan a region including the front and the rear of the transportation vehicle T, and can also detect an obstacle R by measuring a distance to the obstacle R that may exist around the transportation vehicle T including the front of the transportation vehicle T and that can obstruct the operation of the transportation vehicle T. It is assumed that the obstacle R is, for example, a utility pole, a wall of a tunnel, a railroad crossing or parking lot barrier, a median strip, another parked vehicle, another driving vehicle, a guard temporarily provided on a road surface under construction, and the like. The distance sensor 1 is, for example, a two-dimensional or three-dimensional laser range finder (LRF) or a two-dimensional or three-dimensional light detection and ranging or laser imaging detection and ranging (LIDAR). In addition, the data of a sensor used for simultaneous localization and mapping (SLAM) may be applied to the distance sensor 1. An object for which the distance sensor 1 measures a distance may be collectively referred to as a surrounding body. That is, the surrounding body includes the obstacle R, the transportation target C, the loading platform N, a ground G (road surface), and the like.

The shape recognition portion 2 identifies an outer shape from a data point cloud based on measurement data acquired from the distance sensor 1. Here, the measurement data is, for example, data showing a distance to a target measured by the distance sensor 1. When this data is visualized, a plurality of measurement points, which are points on a surface of the target whose distance to the distance sensor 1 is measured by irradiating the surface of the target with pulsed laser light, are displayed as points on the target. This plurality of points is referred to as a data point cloud. The shape recognition portion 2 groups (makes a set of) continuous measurement points having close heights based on the acquired data point cloud to identify the measurement points as an outer shape of a body. Furthermore, the shape recognition portion 2 can detect not only the shape of the transportation target C but also an outer shape of a body that can be the obstacle R in a traveling direction. Therefore, the shape recognition portion 2 also serves as an obstacle detection sensor. Furthermore, the distance sensor 1 and the arithmetic device P are electrically and/or electronically connected to exchange signals with each other.

The arrangement storage portion 3 stores a group of measurement points identified by the shape recognition portion 2 by time (by frame). In addition, the arrangement storage portion 3 also stores the outer shape of the body in the traveling direction in the same manner.

In the group of measurement points stored in the arrangement storage portion 3, the load collapse determination portion 4 determines whether the shape of the group is linear. Then, the load collapse determination portion 4 uses the group of linear measurement points as a determination reference for the arrangement of the transportation target C to determine a load collapse. That is, the load collapse determination portion 4 compares the arrangement of a group in a current frame with the arrangement of a group of measurement points having close height positions in an immediately previous frame (previous or past frame) using the group of linear measurement points to determine that there is a load collapse in a case where a difference in arrangement is at a threshold value or greater.

The display portion 5 is, for example, a monitor provided in central control equipment or the like that manages the driving of an unmanned transportation vehicle and displays a warning or the like in a case where it is determined as a load collapse. Furthermore, in a case where an operator is present in the transportation vehicle T, a warning may be displayed on a windshield of a driver's seat, a vehicle-mounted monitor, or the like. Furthermore, the central control equipment or the like refers to an equipment that allows an observer to constantly monitor, for example, driving status such as the presence or absence of a load collapse in an unmanned transportation vehicle. As necessary, an instruction such as stop may be transmitted from the central control equipment or the like to the unmanned transportation vehicle. In addition, the central control equipment or the like may monitor a plurality of unmanned transportation vehicles at the same time.

Figure 3:
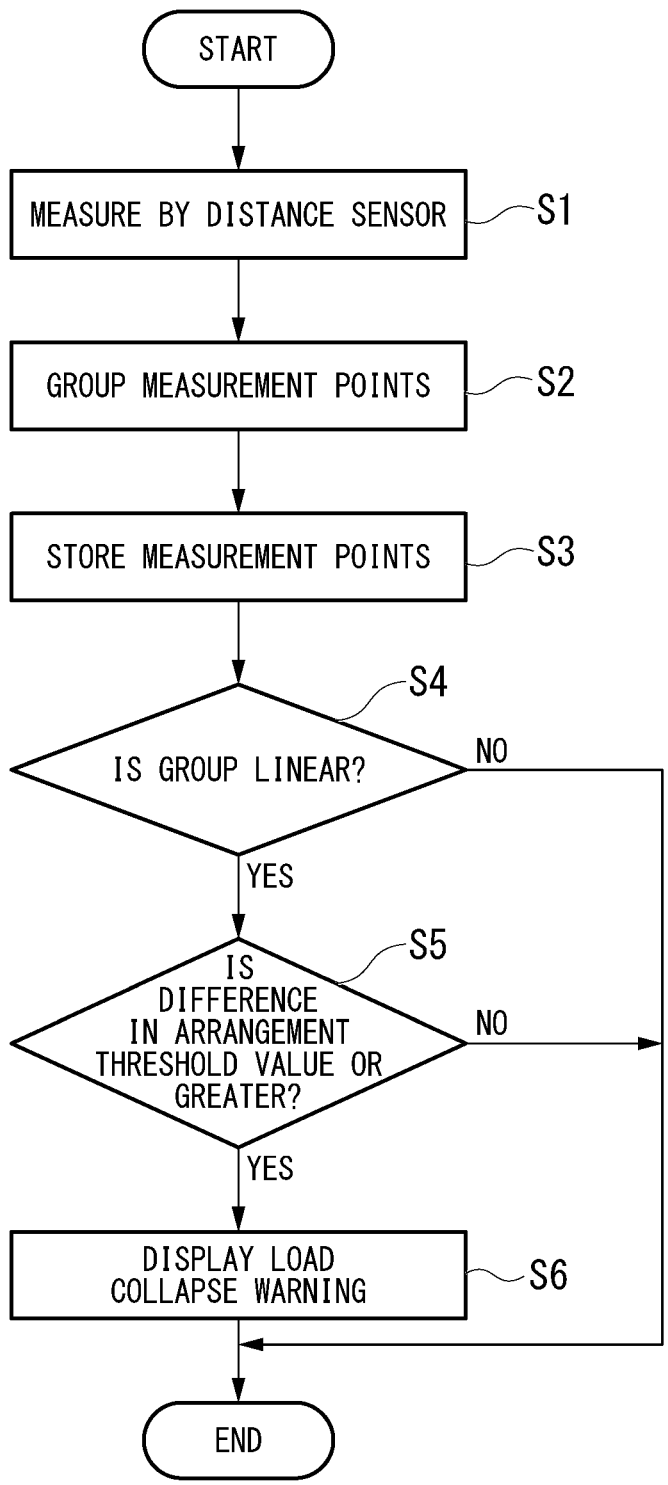
FIG. 3 is a flowchart illustrating a load collapse determination procedure of a drive control system according to an embodiment of the present disclosure.

A flow of the load collapse determination in the drive control system S will be described with reference to FIG. 3.

The distance sensor 1 measures a distance to a point cloud of the measurement points of the transportation target C (step S1).

Then, the shape recognition portion 2 compares the heights of the acquired point clouds in a vertical direction, and groups the measurement points having close distances and close heights of the point clouds (i.e., in which a difference in distance and height is of a predetermined value or less) (step S2).

Then, the arrangement storage portion 3 stores the measurement points grouped by the shape recognition portion 2 (step S3). Moreover, the load collapse determination portion 4 determines whether the group in a current frame is linear (step S4). In the step S4, in a case where the determination is NO, that is, in a case where the group is not linear, load collapse determination is not performed.

In the step S4, in a case where the determination is YES, that is, in a case where the group is linear, the load collapse determination portion 4 determines whether a difference between the arrangement of a group (G1) of measurement points in a current frame, and the arrangement of a group (G2) of measurement points whose position is close to the group (G1) of the measurement points in the current frame in an immediately previous frame stored in the arrangement storage portion 3 is at a threshold value or greater (step S5). In the step S5, in a case where the determination is YES, that is, in a case where a difference in arrangement is at the threshold value or greater, it is determined that a load collapse has occurred, and a warning is displayed on the display portion 5 (step S6). In addition, in a case where the determination is NO in the step S5, that is, in a case where the difference in arrangement is less than the threshold value, it is determined that a load collapse has not occurred.

Furthermore, in a case where the transportation vehicle T turns or the like, there may be a case where a connection angle between the trailer head H and the transportation target C changes. In such a case, a change in the arrangement of the transportation target C can be detected by acquiring a value of the connection angle between the trailer head H and the transportation target C from a sensor (e.g., angle sensor) provided on the transportation vehicle T to measure the connection angle, and correcting measurement data acquired by the distance sensor 1 by the connection angle.

According to the present embodiment, the arrangement of the transportation target C can be detected using the distance sensor 1 that also serves as an obstacle detection sensor to determine a load collapse by the load collapse determination portion 4. Accordingly, a load collapse of the transportation target C can be determined with a simple configuration without providing a load collapse detection sensor separately from the obstacle detection sensor. The load collapse of the transportation target C can be determined with a simple configuration, thereby suppressing a processing capacity of the arithmetic device P mounted on the drive control system S to a low level and increasing a processing speed of the arithmetic device P. Therefore, it is possible to contribute to the implementation of autonomous driving of the transportation vehicle T that is transporting the transportation target C, thereby improving computer-related technology.

According to the present embodiment, a group of a plurality of continuous linear measurement points in an outer shape of the transportation target C is used as a reference for the arrangement of the transportation target C. Accordingly, comparison between frames can be easily performed to facilitate the determination of a load collapse.

In addition, according to the present embodiment, since the distance sensor 1 is mounted at an upper part of the transportation vehicle T, a blind spot can be reduced in both front and rear of a traveling direction. Therefore, the obstacle R in front of the traveling direction and the transportation target C in rear of the traveling direction can be measured.

Furthermore, the present disclosure is not limited to the above embodiment, and for example, the following modifications are considered.

(1) In the above embodiment, in a case where a load collapse occurs, a warning is displayed on the display portion 5, but the present disclosure is not limited thereto. For example, in a case where a load collapse occurs, a process of stopping the driving of the transportation vehicle T from the central control equipment or the like may be performed. This process may be performed artificially by an observer in the central control equipment or the like, or may be automatically performed by the central control equipment or the like.

(2) In the above embodiment, a distance is measured using LiDAR as a measurement portion, but the present disclosure is not limited thereto. For example, an omnidirectional camera, a wide-angle radar, or the like may be used as the measurement portion.

Figure 4:
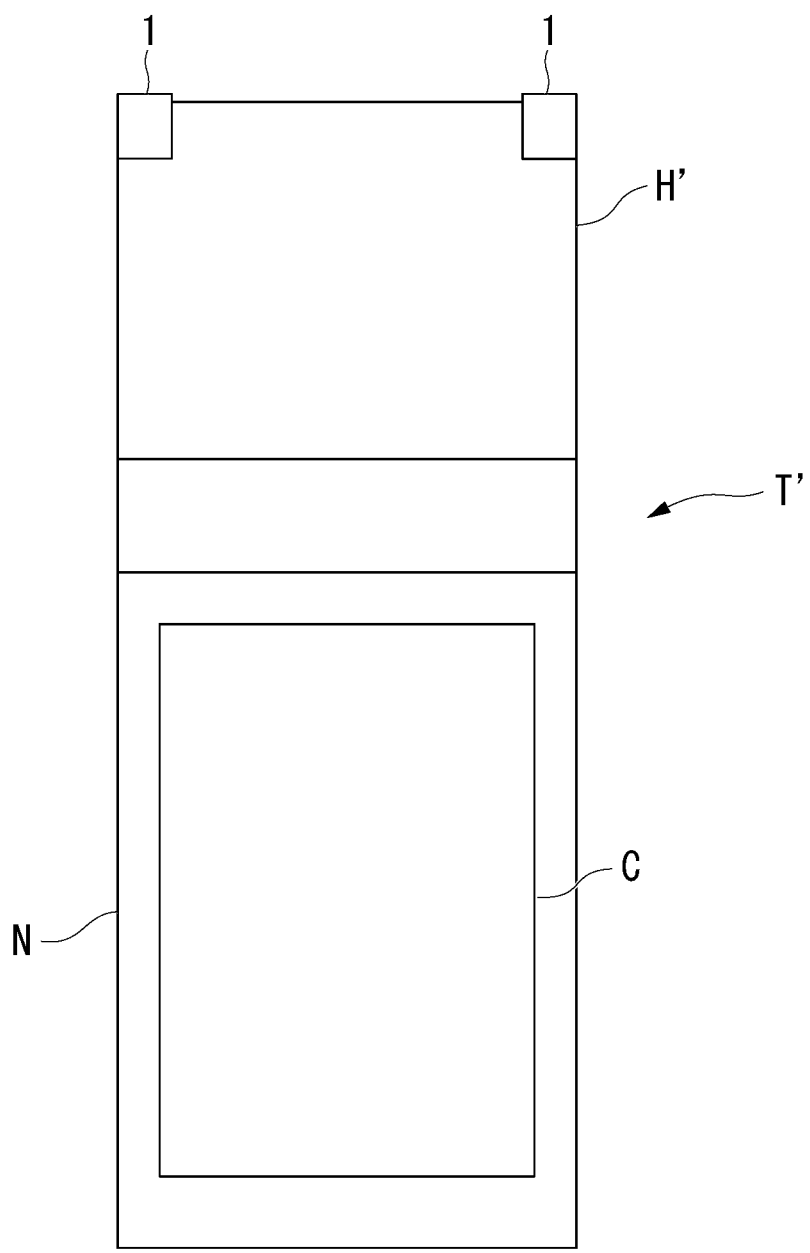
FIG. 4 is a schematic diagram showing a modified example of a mounting position of a distance sensor in a transportation vehicle.

(3) In addition, a plurality of distance sensors 1 may be provided. For example, as shown in FIG. 4, the distance sensors 1 may be provided at two places at left and right ends of a trailer head H' in a direction orthogonal to a traveling direction (left-right direction) of a transportation vehicle T'. In this case, measurement points measured by the distance sensors 1 at the two places can be compared to detect the arrangement of the transportation target C. In this case, not only a measurement range of the distance sensors 1 can be widened by reducing a blind spot of the distance sensors 1, but also the measurement points measured by the distance sensors 1 at two places can be compared to detect the arrangement of the transportation target C, thereby more widely and accurately detecting the arrangement of the transportation target C.

(4) In the above embodiment, the drive control system S is a system that supports autonomous driving of an unmanned transportation vehicle, but the present disclosure is not limited thereto. For example, the drive control system S may be a system that provides driving support information to a driver of a manned transportation vehicle. In this case, load collapse warning information is displayed on a monitor that can be visually recognized by the driver of the transportation vehicle T or on a windshield.

(5) Furthermore, in the above embodiment, it is determined that a load collapse has occurred, but a state where the transportation target C is losing its balance can be detected by reducing a threshold value of change in the arrangement of the transportation target C. Thus, the occurrence of a load collapse of the transportation target C can be predicted or it is possible to issue a warning at a stage when a deviation, which may grow into a load collapse in the future, occurs.

(6) In the above embodiment, the warning information of a load collapse is displayed on the display portion, but the present disclosure is not limited thereto. The warning information of the load collapse may be notified as voice to a manager of the unmanned transportation vehicle or the driver of the manned transportation vehicle.

(7) In the above embodiment, as shown in FIG. 2, it is assumed that the number of transportation targets C is one, but the present disclosure is not limited thereto, and a load collapse can be determined even when there are a plurality of transportation targets C.

INDUSTRIAL APPLICABILITY

According to a drive control system of the present disclosure, it is possible to determine a load collapse of a transportation target with a simple configuration based on measurement data of a measurement portion that detects an obstacle by a load collapse determination portion.

REFERENCE SIGNS LIST

1: Distance sensor
2: Shape recognition portion
3: Arrangement storage portion
4: Load collapse determination portion
5: Display portion
C: Transportation target
S: Drive control system

The invention claimed is:

1. A drive control system comprising:
a measurement portion configured to detect a surrounding body including a transportation target in a transportation vehicle; and
a load collapse determination portion configured to acquire an arrangement of the transportation target loaded on the transportation vehicle based on measurement data of the measurement portion to determine a load collapse of the transportation target based on a change in the arrangement over time;
wherein
the transportation vehicle includes:
a trailer head provided with the measurement portion; and
a loading platform on which the transportation target is loaded and which is connected to the trailer head; and
the load collapse determination portion detects the change in the arrangement of the transportation target by correcting the measurement data acquired by the measurement portion by a connection angle between the trailer head and the transportation target in a case where the transportation vehicle turns.

2. The drive control system according to claim 1, wherein the measurement portion performs scanning with laser light to measure a distance between the trailer head and the surrounding body.

3. The drive control system according to claim 2, wherein the load collapse determination portion uses a set of a plurality of continuous linear measurement points in an outer shape of the transportation target as a reference for the arrangement of the transportation target.

4. The drive control system according to claim 1, wherein the measurement portion is provided at an upper part of the trailer head.

5. The drive control system according to claim 1, wherein the measurement portion is provided at each of left and right ends of the trailer head.

6. The drive control system according to claim 2, wherein the measurement portion is provided at an upper part of the trailer head.

7. The drive control system according to claim 3, wherein the measurement portion is provided at an upper part of the trailer head.

8. The drive control system according to claim 2, wherein the measurement portion is provided at each of left and right ends of the trailer head.

9. The drive control system according to claim 3, wherein the measurement portion is provided at each of left and right ends of the trailer head.

* * * * *